United States Patent
Barber et al.

(10) Patent No.: US 11,481,138 B2
(45) Date of Patent: Oct. 25, 2022

(54) CREATING INDENTICAL SNAPSHOTS

(71) Applicant: EMC IP Holding Company LLC, Hopkinton, MA (US)

(72) Inventors: Michael Barber, Pearland, TX (US); Yaron Dar, Sudbury, MA (US); Michael E. Specht, Bolton, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 17/038,235

(22) Filed: Sep. 30, 2020

(65) Prior Publication Data

US 2022/0100380 A1    Mar. 31, 2022

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 7,340,489 B2 | 3/2008 | Vishlitzky et al. | |
| 9,965,216 B1 | 5/2018 | Jaganathan et al. | |
| 2017/0185491 A1* | 6/2017 | Hajare | G06F 11/2097 |

OTHER PUBLICATIONS

U.S. Appl. No. 16/885,702, filed May 28, 2020, Tobin, et al.

* cited by examiner

*Primary Examiner* — Daniel D Tsui
(74) *Attorney, Agent, or Firm* — Muirhead and Saturnelli, LLC

(57) ABSTRACT

Snapshots are created on replicated storage systems R1 and R2 in a manner resulting in identical snapshots being generated on R1 and R2. In response to an instruction to create a snapshot on a storage system (R1 and/or R2), command-phase write operations (CWOs) are held and data-phase write operations (DWOs) are completed on the storage system before the snapshot is created. Determining that DWOs includes querying processes, and using information, available on the storage system, by which a state of a write operation—e.g., whether the write operation is a DWO and when the DWO completes—may be determined. A CWO queue may be maintained on the storage system for tracking the status of CWOs. A DWO queue may be maintained on the storage system for tracking DWOs, to determine DWOs when the snapshot is created, and track their processing, including when they are completed.

18 Claims, 10 Drawing Sheets

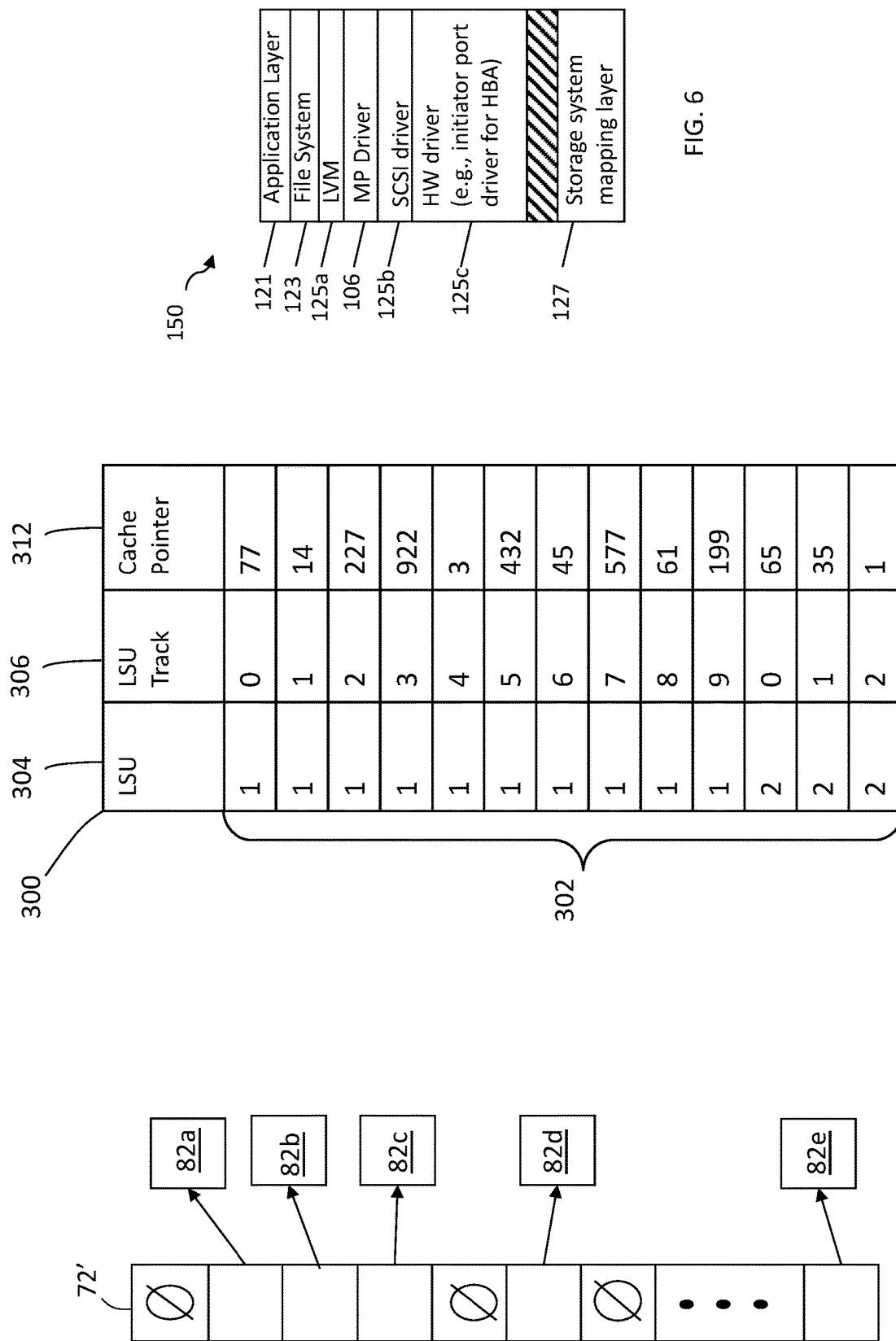

FIG. 8

| LSU | Host Port | Front-End Port | Other Info |
|---|---|---|---|
| Dev0 | WWN12 | WWN45 | |
| Dev1 | WWN9 | WWN117 | |
| ... | | | |
| Dev*n* | WWN77 | WWN6 | |

FIG. 9

| Initiator Port | Target Port | Other Info |
|---|---|---|
| WWW1 | WWW3 | |
| WWW7 | WWW8 | |
| ... | | |
| WWW9 | WWW2 | |

FIG. 10A

| LSU | I/O Op | Status | FA Port | Host Port | Other Info |
|---|---|---|---|---|---|
| Dev0 | | | WWN12 | WWN45 | |
| Dev1 | | | WWN9 | WWN117 | |
| ... | | | | | |
| Dev*n* | | | WWN77 | WWN6 | |

FIG. 10B

| LSU | I/O Op | Status | FA Port | Host Port | Other Info |
|---|---|---|---|---|---|
| Dev0 | | | WWN12 | WWN45 | |
| Dev1 | | | WWN9 | WWN117 | |
| ... | | | | | |
| Dev*n* | | | WWN77 | WWN6 | |

CREATING INDENTICAL SNAPSHOTS

BACKGROUND

Technical Field

This application generally relates to data storage systems, and more particularly to creating snapshots for replicated data storage systems.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switch and storage system over which I/O operations between an application and storage device can be communicated may be considered an I/O path between the application and the storage device. These I/O paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed, including: receiving at a storage system an instruction to generate a first snapshot of a logical storage unit; determining if one or more write operations for the logical storage unit have data currently being processed on the storage system when the instruction is received; if one or more write operations for the logical storage unit have data currently being processed on the storage system when the instruction is received, determining when the processing of the one or more write operations on the storage system is completed; and, in response to determining that the processing of the data of the one or more write operations has been completed on the storage system, generating the first snapshot of the logical storage unit. The method may further include, in response to receiving the instruction, for each write operation initiated by a host system for which data has not started being processed on the storage system when the instruction is received, preventing the processing of the data of the write operation on the storage system until the generation of the first snapshot is complete. The method may further include, for each of the one or more write operations for which the processing of the data on the storage system has been prevented until the generation of the first snapshot is complete, creating an entry in a queue, each entry in the queue representing a respective one of the one or more write operations for which the processing of the data on the storage system has been prevented, and, in response to completion of the generation of the first snapshot, starting the processing of the data of each write operation having any entry in the queue. The method may further include, for each of the one or more write operations that have data currently being processed on the storage system when the instruction is received, creating an entry in a queue, each entry in the queue representing a respective one of the one or more write operations having data currently being processed on the storage system when the instruction is received. The storage system may be a first storage system configured to synchronously replicate data of the logical storage unit to a second storage system, and it may be determined that one or more write operations for the logical storage unit have data currently being processed on the first storage system, including the one or more write operations being replicated to the second storage system, and the method further may include: receiving at the second storage system an instruction to generate a second snapshot of the logical storage unit specific to a same point in time as the first snapshot of the first storage system, and generating the second snapshot on the second storage system. The first snapshot and the second snapshot may be identical. The method may further include, in response to a failure on a system including the first storage system and the second storage system, recovering data of the logical storage unit on the first storage system using the first snapshot independently of, and concurrently to, recovering data of the logical storage unit on the second storage system using the second snapshot. The first storage system may include a plurality of directors that process I/O operations on the first storage system, and determining if one or more write operations for the logical storage unit have data currently being processed on the storage system when the instruction is received may include polling each of the plurality of directors to determine each director is currently processing data for any write operations.

In other embodiments of the invention, a system including executable logic that implements a method including: receiving at a storage system an instruction to generate a first snapshot of a logical storage unit; determining if one or more write operations for the logical storage unit have data currently being processed on the storage system when the instruction is received; if one or more write operations for the logical storage unit have data currently being processed on the storage system when the instruction is received, determining when the processing of the one or more write operations on the storage system is completed; and, in response to determining that the processing of the data of the one or more write operations has been completed on the storage system, generating the first snapshot of the logical storage unit. The method further may include, in response to receiving the instruction, for each write operation initiated by a host system for which data has not started being processed on the storage system when the instruction is received, preventing the processing of the data of the write operation on the storage system until the generation of the first snapshot is complete. The method further may include: for each of the one or more write operations for which the processing of the data on the storage system has been prevented until the generation of the first snapshot is complete, creating an entry in a queue, each entry in the queue representing a respective one of the one or more write operations for which the processing of the data on the storage system has been prevented; and, in response to completion of the generation of the first snapshot, starting the processing of the data of each write operation having any entry in the queue. The method further may include, for each of the one or more write operations that have data currently being processed on the storage system when the instruction is received, creating an entry in a queue, each entry in the queue representing a respective one of the one or more write operations having data currently being processed on the storage system when the instruction is received. The storage system may be a first storage system configured to synchronously replicate data of the logical storage unit to a second storage system, where it may determined that one or more write operations for the logical storage unit have data currently being processed on the first storage system, including the one or more write operations being replicated to the second storage system, and the method further may include: receiving at the second storage system an instruction to generate a second snapshot of the logical storage unit specific to a same point in time as the first snapshot of the first storage system, and generating the second snapshot on the second storage system. The first snapshot and the second snapshot may be identical. The method further may include, in response to a failure on a system including the first storage system and the second storage system, recovering data of the logical storage unit on the first storage system using the first snapshot independently of, and concurrently to, recovering data of the logical storage unit on the second storage system using the second snapshot. The first storage system may include a plurality of directors that process I/O operations on the first storage system, and determining if one or more write operations for the logical storage unit have data currently being processed on the storage system when the instruction is received may include polling each of the plurality of directors to determine each director is currently processing data for any write operations.

In other embodiments of the invention, computer-readable media has software stored thereon including: executable code that receives at a storage system an instruction to generate a first snapshot of a logical storage unit; executable code that determines if one or more write operations for the logical storage unit have data currently being processed on the storage system when the instruction is received; executable code that determines, if one or more write operations for the logical storage unit have data currently being processed on the storage system when the instruction is received, when the processing of the one or more write operations on the storage system is completed; and executable code that determines, in response to determining that the processing of the data of the one or more write operations has been completed on the storage system, generating the first snapshot of the logical storage unit. The software further may include executable code that, in response to receiving the instruction, for each write operation initiated by a host system for which data has not started being processed on the storage system when the instruction is received, prevents the processing of the data of the write operation on the storage system until the generation of the first snapshot is complete. The software further may include: executable code that, for each of the one or more write operations for which the processing of the data on the storage system has been prevented until the generation of the first snapshot is complete, creates an entry in a queue, each entry in the queue representing a respective one of the one or more write operations for which the processing of the data on the storage system has been prevented; and executable code that, in response to completion of the generation of the first snapshot, starts the processing of the data of each write operation having any entry in the queue. The software further may include executable code that, for each of the one or more write operations that have data currently being processed on the storage system when the instruction is received, creates an entry in a queue, each entry in the queue representing a respective one of the one or more write operations having data currently being processed on the storage system when the instruction is received. The storage system may be a first storage system configured to synchronously replicate data of the logical storage unit to a second storage system, where it may be determined that one or more write operations for the logical storage unit have data currently being processed on the first storage system, including the one or more write operations being replicated to the second storage system, and where the software further may include: executable code that receives at the second storage system an instruction to generate a second snapshot of the logical storage unit specific to a same point in time as the first snapshot of the first storage system, and executable code that generates the second snapshot on the second storage system, and where the first snapshot and the second snapshot are identical. The software further may include executable code that, in response to a failure on a system including the first storage system and the second storage system, recovers data of the logical storage unit on the first storage system using the first snapshot independently of, and concurrently to, recovering data of the logical storage unit on the second storage system using the second snapshot.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

FIG. 10A is a block diagram illustrating an example of a command-phase write operation queue, according to embodiments of the invention;

FIG. 10B is a block diagram illustrating an example of a data-phase write operation queue, according to embodiments of the invention.

DETAILED DESCRIPTION OF EMBODIMENTS

Figure 1:
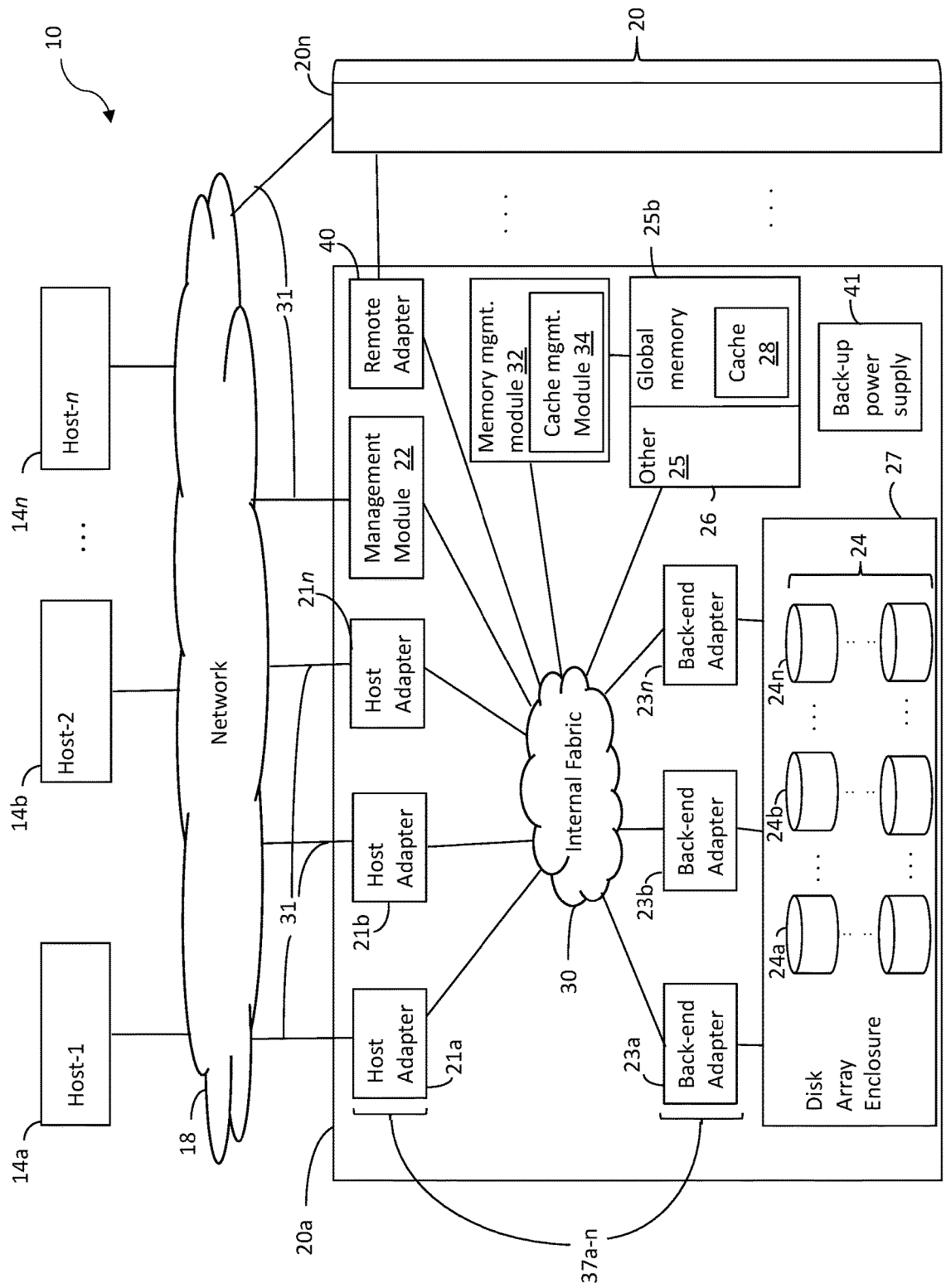
FIG. 1 is a block diagram illustrating an example of a data storage network, according to embodiments of the invention.

On some data storage networks, remote data replication is employed between two or more storage systems, where LSUs from each storage system are logically paired so that the LSU data is replicated from one storage system (e.g., R1) to the other storage system (e.g., R2) synchronously (synchronous replication) or asynchronously (asynchronous replication), as described in more detail elsewhere herein. One configuration for synchronous replication is referred to as active-active, which is described in more detail elsewhere herein.

On some storage systems today, local replication may be performed using snapshots. There are several known techniques, including those described in U.S. Pat. No. 7,340,489 to Vishlitzky, et al. titled "Virtual Storage Devices," issued Mar. 4, 2008, U.S. Pat. No. 9,965,216 to Jaganathan et al., titled "Targetless Snapshots," issued May 8, 2018, and U.S. patent application Ser. No. 16/885,702 to Tobin et al., titled "Snapshot Metadata Deduplication," filed May 28, 2020, the entire contents of each of which is hereby incorporated by reference.

In storage systems employing snapshots locally, when an instruction is received to create a snapshot, a write operation may have been initiated on a host system, but no data specified by the write operation may have been transmitted to the storage system yet. For example, a write command of the write operations (e.g., a command descriptor block (CDB) in accordance with SCSI technology) may have been sent from the host system to the storage system, but the actual data to be written (i.e., the write data) may not have been transmitted from the host system to the storage system yet. A write operation in such a state may referred to as a "command-phase write operation" or "CWO". In some storage systems, when an instruction to create a snapshot is received, the storage system holds further processing of the CWOs until creation of the snapshot has been completed; i.e., until the snapshot process is completed. As used herein, the "snapshot process" begins on a storage system when a snapshot instruction is received and ends at the completion of the creation of the snapshot. Holding the CWOs in this manner may be performed as part of what is referred to on some storage systems as opening a consistency window.

When an instruction to create a snapshot is received, data for some write operations may have been transmitted already from the host system to the storage systems, but not yet completed on the storage system, For example, at the time an instruction to create a snapshot is received, the data of the write operation may have been sent to the storage system, but no acknowledgement sent yet from the storage system to the host system indicating that the write operation is complete. That is, the data of such a write operation may be currently being processed on the storage system, which data may be referred to as being "in flight" or as "in-flight data." A write operation in such a state may be referred to herein as a "data-phase write operation" or "DWO." In some storage systems, when an instruction to create a snapshot is received, while CWOs are being held as part of opening a consistency window, DWOs are allowed to complete. The DWOs are allowed to complete because not allowing the DWOs to complete, i.e., terminating their execution while data is in flight as part of implementing a consistency window, could result in data corruption on a data storage system, e.g., a "torn page."

A potential drawback of a storage system configured as described above is that, if synchronous replication is being implemented on such a storage system (R1), then allowing DWOs to complete during the consistency window may result in a snapshot taken (i.e., created) on R1 being different than a snapshot taken at the same time on the storage system on which the replicated storage system is synchronously replicated (R2). As a result, in the event of a system failure or planned system reboot, when the two data storage systems are restored, one of the storage systems (e.g., R1) may be temporarily established as the primary storage system (e.g., the active storage system in an active-passive configuration). As used herein, a "system failure" may include any hardware or data corruption that may cause the data to be un-useful. Such data corruption may occur as a result of faulty hardware (e.g., a bad host bus adapter (HBA) causing data corruption on both sides of a remote replication pair) and/or a cyber-attack such as ransomware (e.g., where the data is encrypted and is replicated to both sides of the remote replication pair) where the user needs to recover the data on both sides of a remote replication pair. The state of the data at an earlier point in time may be restored from the snapshot for such point in time on R1, and R2 then may be resynchronized with the restored data on R1 for the point in time, after which the active-active configuration of R1 and R2 may be restored. Such a restoration process may be time consuming, during which time performance of some I/O operations is delayed and/or there may not be a disaster recovery solution if a failure occurs during the recovering process.

What may be desirable is snapshot technology that ensures identical snapshots are created on synchronously replicated (e.g., active-active) data storage systems.

One potential solution is to reject each DWO, for example by sending a SCSI check condition (e.g., using sense code 0b/44) to the host for the DWO. However, doing so may create a lot of noise on the storage network, potentially prompting a flurry of communications, including notifications, alarms and further checks, all of which would be false alarms. Another potential solution is to wait, after opening the consistency window (including holding CWOs), a predefined amount of time long enough (e.g., several seconds) to ensure that all DWOs are complete before creating the snapshot. However, such waiting may cause an unacceptable increase in response times for I/O operations being processed during the wait.

Yet another potential solution is to wait, while the consistency window is open, until all DWOs are complete before creating the snapshot, rather than wait a predefined amount of time. For example, the storage system could query all host systems connected to the storage system to determine which (if any) host systems have DWOs for the LSU for which the snapshot is to be created at the time of receiving the instruction to create the snapshot, and to wait until all such DWOs are complete before creating the snapshot. However, depending on the number of connected host systems, including virtual instances of host systems, and applications running thereon, making such determinations may involve a significant amount of communication that could result in unacceptable delays while CWOs continue to be held. Further, host systems (e.g., the operating systems thereof) may not readily know or be able to determine the current state of the write operations the host system sent to the storage system, for example, whether each such write operation is currently a CWO or DWO. That is, while the host system may know that a write operation is open—i.e., has not been acknowledged as complete by the storage system, the host system may not know which open write operations are DWOs.

Described herein are mechanisms and techniques for creating snapshots on replicated storage systems, e.g., R1 and R2, which may be in an active-active configuration, in a manner resulting in identical snapshots being generated on R1 and R2. As a result, in the event of a system failure, identical snapshot data (corresponding to a point-in-time) may be recovered on R1 and R2 independently and concurrently.

In some embodiments of the invention, in response to an instruction to create a snapshot on a storage system, CWOs are held (e.g., as part of opening a consistency window) and DWOs are completed on the storage system before the snapshot is created. Determining whether there are any DWOs and, if so, whether the DWOs are complete does not involve querying host systems, but rather may include querying processes executing on, and using information available on, the storage system, by which a state of a write operation—e.g., whether the write operation is a DWO and when the DWO completes—may be determined. Determining whether a write operation is a DWO and, if so, when the DWO completes, on the storage system is faster and more reliable than trying to do so by querying host systems, and is faster than waiting a predefined amount of time long enough to ensure all DWOs have completed.

In some embodiments, a CWO queue is maintained on the storage system for tracking the status of CWOs. The CWO queue may be referenced to determine CWOs for which to hold processing while the consistency window is open, and for which to release the hold upon completing creation of a snapshot. A DWO queue also may be maintained on the storage system for tracking DWOs. The DWO queue may be referenced to determine DWOs for which to complete processing while the consistency window is open before the snapshot is created, and to track such processing, including when the DWOs are completed.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof— e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
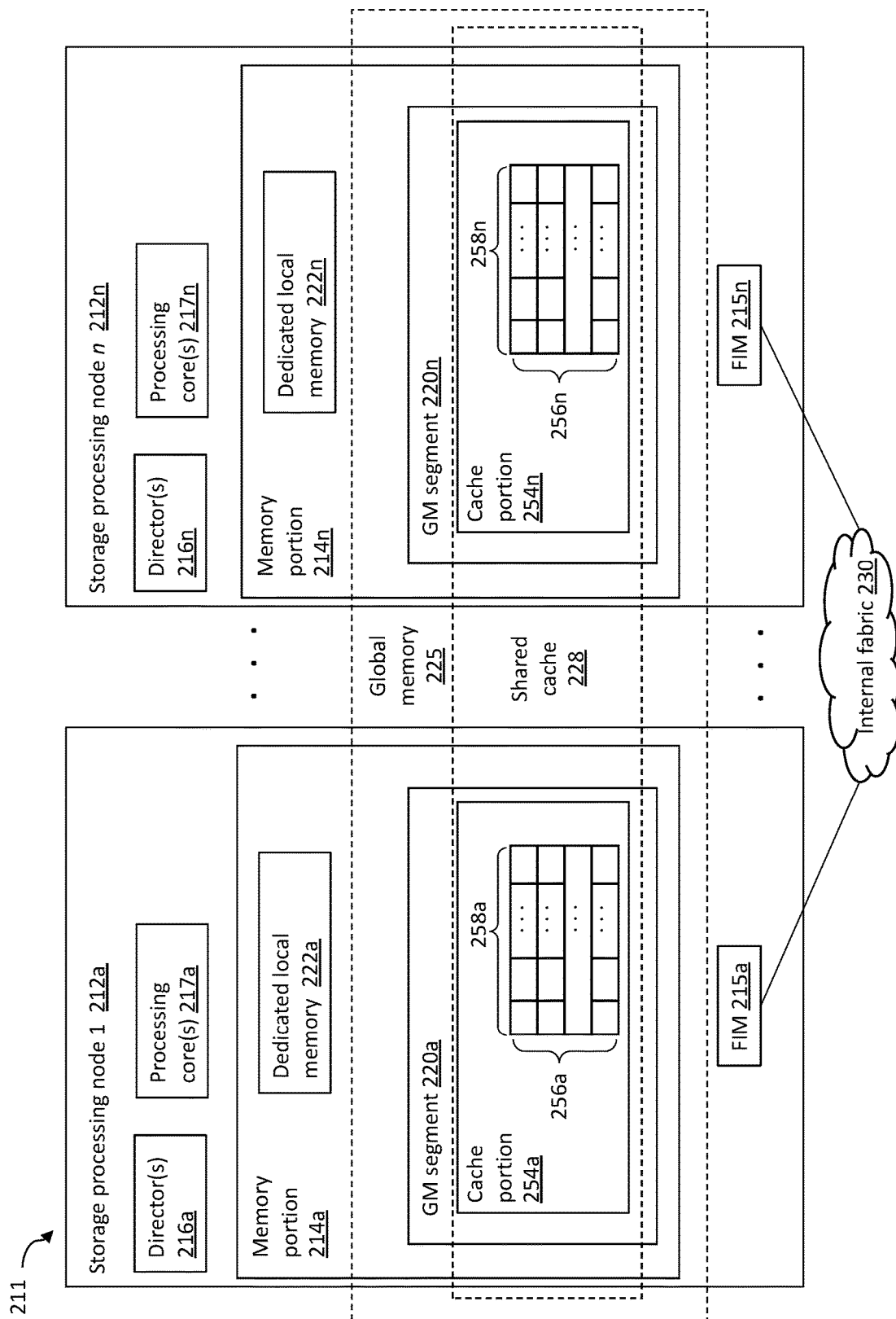
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
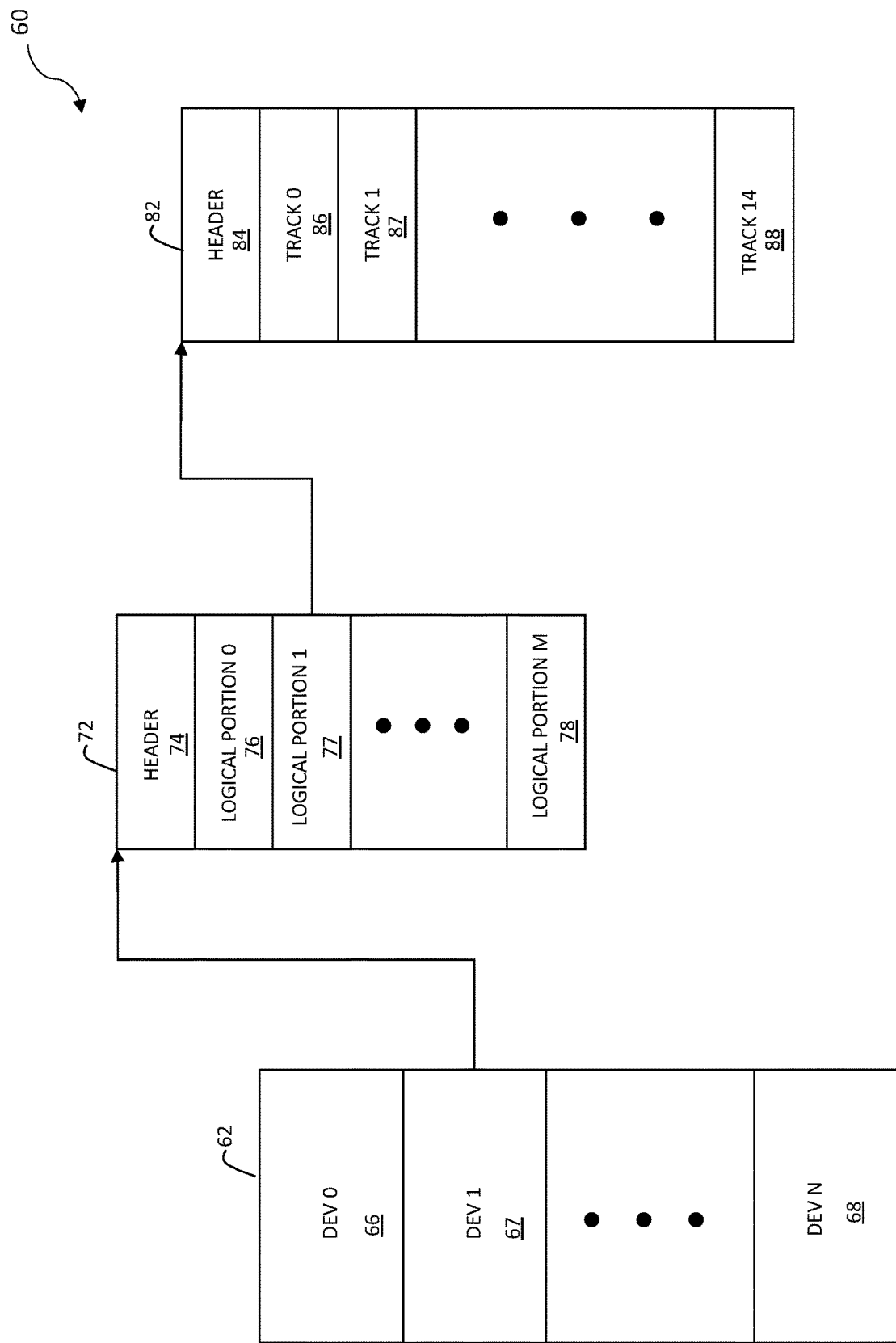
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 300. Other data structures may be stored in any of GM 25b, memory 25a, GM segment 220a-n and/or dedicated local memories 22a-n.

Figure 5:
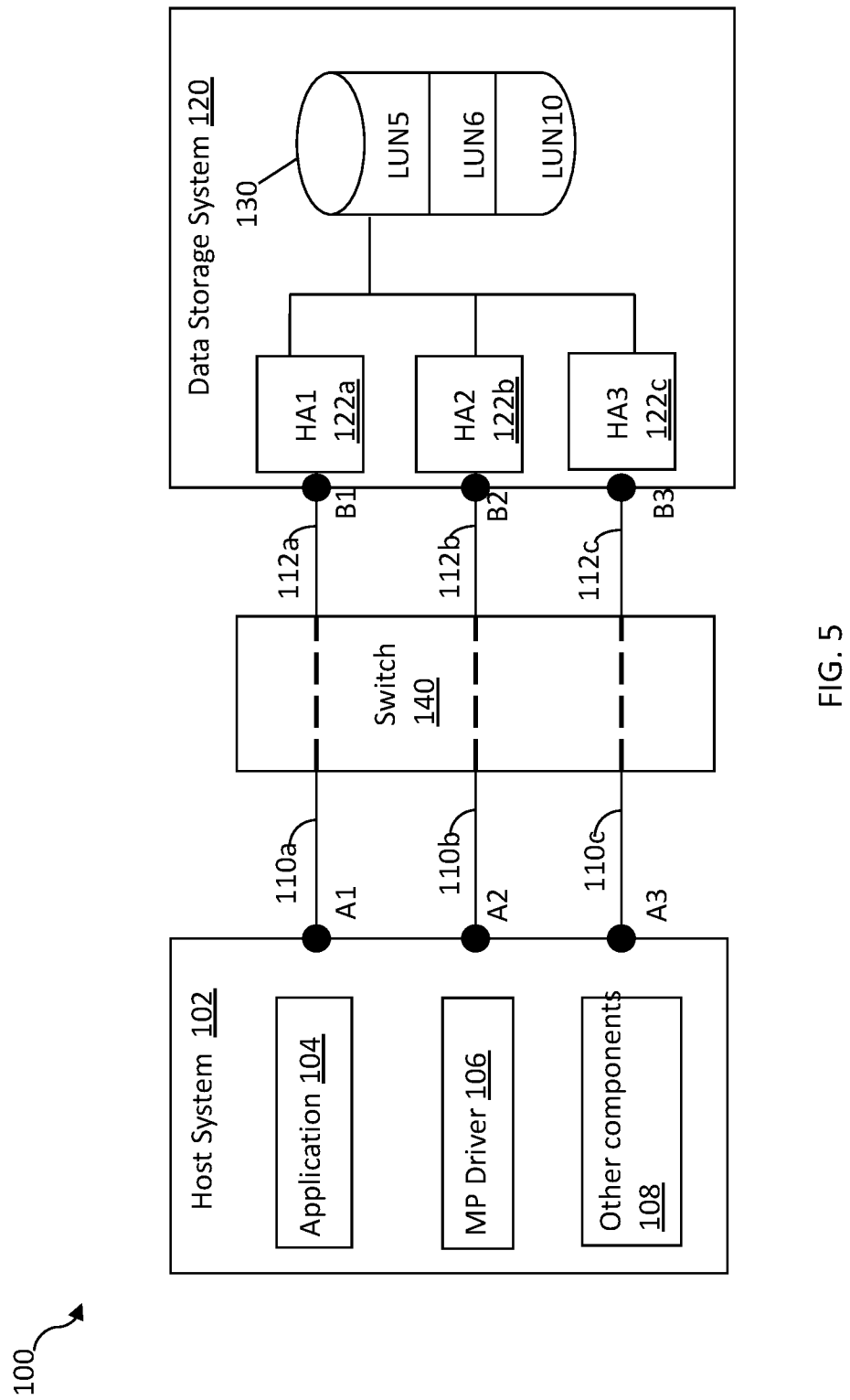
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122a-122c, also denoted respectively as host adapters HA1, HA2 and HA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125*a* that maps the label or identifier specified by the application layer 121 to an LSU which the host system may perceive as corresponding to a physical storage device address (e.g., the address of one of the disk drives) within the storage system. Below the LVM layer 125*a* may be the MP (multi-path) driver 106 which handles processing of the I/O received from layer 125*a*. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125*b* and a hardware (HW) driver 125*c*. The SCSI driver 125*b* may handle processing of a received I/O request from the MP driver 106 such as related to forming a request in accordance with one or more SCSI standards. The driver 125*c* may be a hardware driver that facilitates communication with hardware on the host system. The driver 125*c* may be, for example, a driver for an HBA of the host system which sends commands or requests to the data storage system and also receives responses and other communications from the data storage system. It should be appreciated that, in some embodiments, the ordering of the MP driver 106 and SCSI driver 125*b* may be reversed. That is, in some cases, the MP driver 106 sits below the SCSI driver 126*b*.

In some embodiments, layers 121-125*c* are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125*a*) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125*a*. Communications between an initiator port of the host system and a target port of a data storage system (e.g., target port of an HA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LSUs may be visible or exposed to the host system initiator through the target port of the data storage system.

Data replication may be employed between two or more storage systems on a storage network. Referring back to FIG. 1, the RA (remote adapter) 40 may include hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one to the other synchronously or asynchronously. Generally, the Dell EMC™ SRDF® products are one example of commercially available products that may be used to provide functionality of a remote data facility (RDF) for use in an embodiment in connection with techniques herein.

Figure 7A:
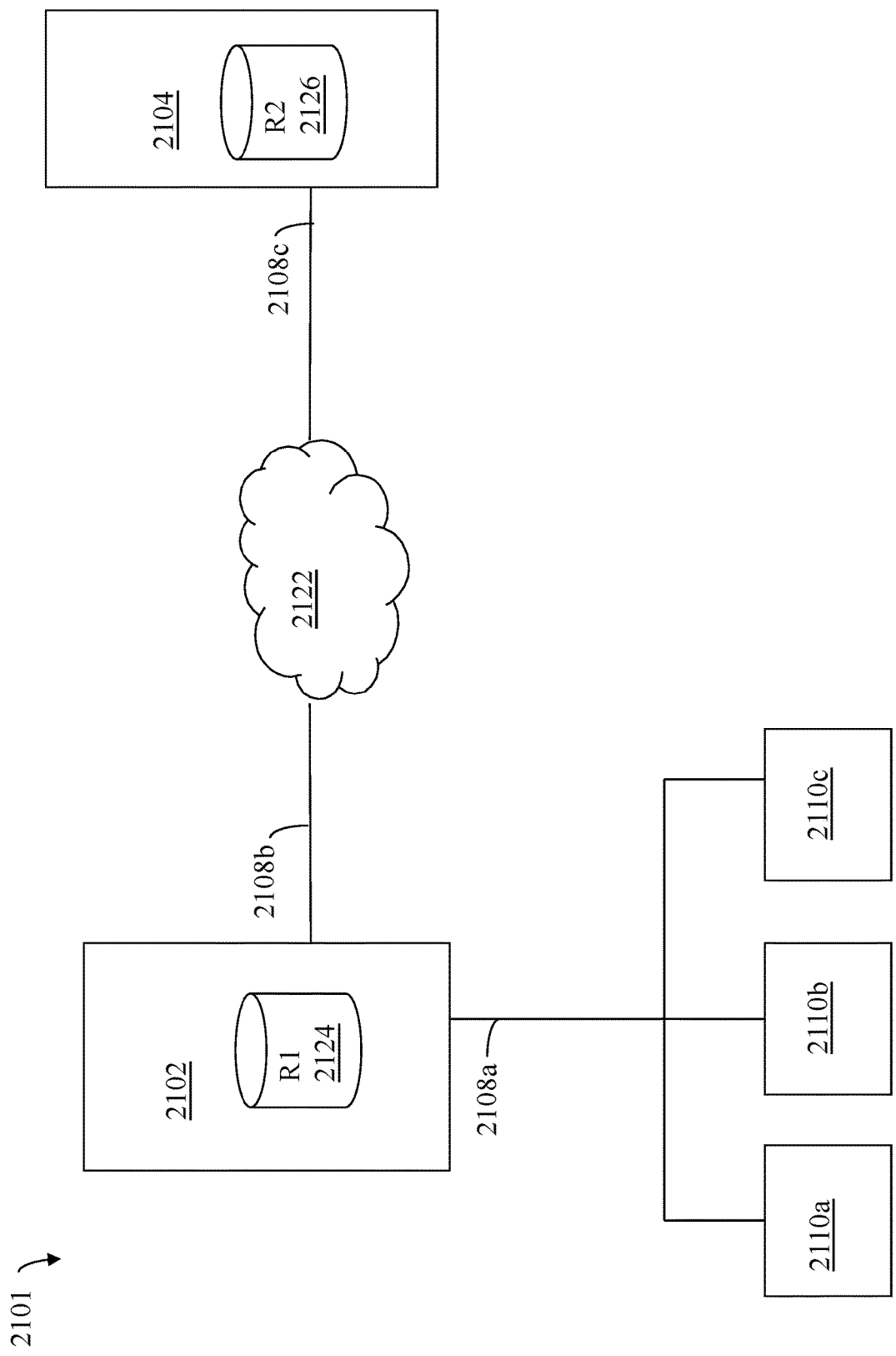
FIGS. 7A-7C are examples of various embodiments of components configured for replication, according to embodiments of the invention.

Referring to FIG. 7A, shown is an example of an embodiment of a system 2101 that may be used in connection with the techniques described herein. It should be noted that the embodiment illustrated in FIG. 7A presents a simplified view of some of the components illustrated in FIG. 1, for example, including only some detail of the data storage system 20a for the sake of illustration.

Included in the system 2101 are data storage systems 2102 and 2104 and hosts 2110a, 2110b and 1210c. The data storage systems 2102, 2104 may be remotely connected and communicate over network 2122, such as the Internet or other private network, and facilitate communications with the components connected thereto. Hosts 2110a, 2110b and 2110c may perform operations to data storage system 2102 over connection 2108a. The hosts 2110a, 2110b and 2110c may be connected to the data storage system 2102 through connection 2108a which may be, for example, network or other type of communication connection. Although not illustrated, the hosts 2110a-2110c may also be directly connected to a network such as the Internet.

The data storage systems 2102 and 2104 may include one or more devices. In this example, data storage system 2102 includes storage device R1 2124 and data storage system 104 includes storage device R2 2126. Both of the data storage systems may include one or more other logical and/or physical devices. Data storage system 2102 may be characterized as local with respect to hosts 2110a, 2110b and 2110c. Data storage system 104 may be characterized as remote with respect to hosts 2110a, 2110b and 2110c. The R1 and R2 device may be configured as LUNs.

The host 1210a may issue a command, such as to write data to device R1 of data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Dell EMC™ SRDF® products. Data storage device communication between data storage systems using Dell EMC™ SRDF® is described, for example, in U.S. Pat. Nos. 5,742,792, 5,544,347, and 7,054,883, all of which are incorporated by reference herein. With Dell EMC™ SRDF®, a user may denote a first storage device, such as R1, as a master storage device and a second storage device, such as R2, as a slave storage device. Other incarnations of Dell EMC™ SRDF® may provide a peer to peer relationship between the local and remote storage devices. In this example, the host 2110a interacts directly with the device R1 of data storage system 2102, but any data changes made are automatically provided to the R2 device of data storage system 2104 using Dell EMC™ SRDF®. In operation, the host 110a may read and write data using the R1 volume in 2102, and Dell EMC™ SRDF® may handle the automatic copying and updating of data from R1 to R2 in data storage system 2104.

As illustrated in connection with other figures herein, data storage system 2102 may have one or more RAs included therein to facilitate remote connections to the data storage system 2104. Communications between storage system 2102 and 2104 may be made over connections 2108b,2108c to network 2122. Data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group in which one or more devices (e.g., LUNs) on a data storage system are associated with a particular group under the control of a single RA which services the devices included therein. Rather than have a single R1 device and a single R2 device, a grouping may be defined so that a source group of devices, such as on data storage system 2102, have corresponding target devices of a target group, such as devices on data storage system 2104. Devices in a source group may be mirrored in corresponding devices of a target group using Dell EMC™ SRDF® functionality.

Techniques herein may be used with Dell EMC™ SRDF®, or more generally any RDF, operating in one or more different supported modes. For example, such modes may include Dell EMC™ SRDF® operating in synchronous mode, asynchronous mode, or adaptive copy mode. For example, in connection with Dell EMC™ SRDF®, the host may issue a write to an R1 device in a first data storage system and the data change is propagated to the R2 device in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Described in following paragraphs are techniques that may be used in connection with performing data replication in a synchronous manner such as Dell EMC™ SRDF® operating in an synchronous mode (Dell EMC™ SRDF®/S). With synchronous mode data replication, a host 2110a may issue a write to the R1 device 2124. The primary or R1 data storage system 2102 may store the write data in its cache at a cache location and mark the cache location as including write pending (WP) data as mentioned elsewhere herein. The remote data replication facility operating in synchronous mode, such as Dell EMC™ SRDF®/S, may propagate the write data across an established RDF link (more generally referred to as a the remote replication link or link) such as over 2108*b*, 2122, and 2108*c*, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110*a* that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including write pending (WP) data as mentioned elsewhere herein. The write data may be propagated across an established RDF link (more generally referred to as a the remote replication link or link) such as over 2108*b*, 2122, and 2108*c*, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110*a* by the system 2102. Thus, in asynchronous mode the system 2102 is not required to wait to receive the acknowledgement from the R2 data storage system 2104 prior to sending the acknowledgement to the host regarding completion of the write operation.

Figure 7B:
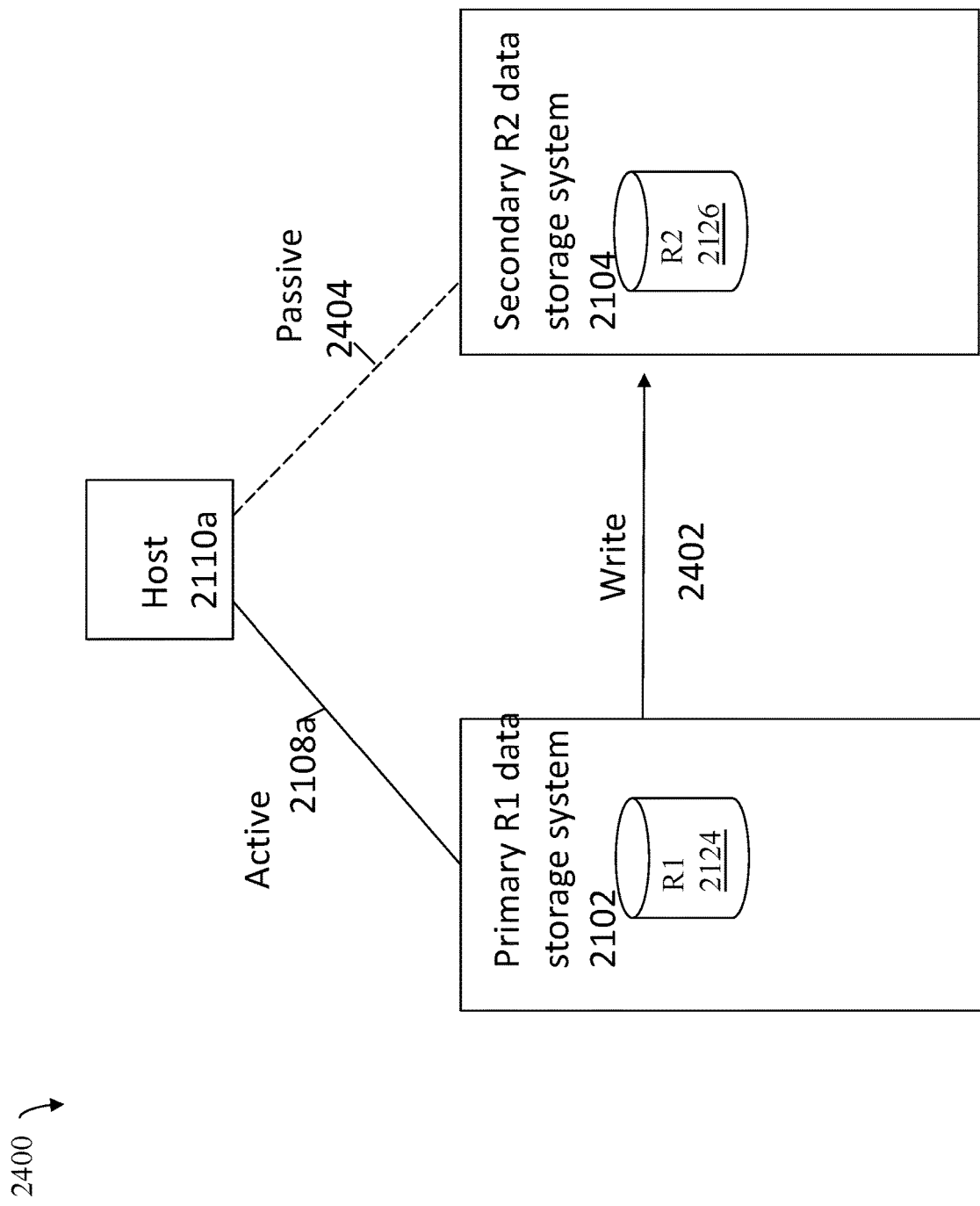

With reference to FIG. 7B, shown is a further simplified illustration of components that may be used in an embodiment in accordance with techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110*a* issues a write, or more generally, all I/Os including reads and writes, over a path to only the primary R1 data storage system 2102. The host 2110*a* does not issue I/Os directly to the R2 data storage system 2104. The configuration of FIG. 7B may also be referred to herein as an active-passive configuration such as may be used with synchronous replication and other supported replication modes where the host 2110*a* has an active connection or path 2108*a* over which all I/Os are issued to only the R1 data storage system. The host 2110*a* may have a passive connection or path 2404 to the R2 data storage system 2104. In the configuration of 2400, the R1 device 2124 and R2 device 2126 may be configured and identified as the same LUN, such as LUN A, to the host 2110*a*. Thus, the host 2110*a* may view 2108*a* and 2404 as two paths to the same LUN A where path 2108*a* is active (over which I/Os may be issued to LUN A) and where path 2404 is passive (over which no I/Os to the LUN A may be issued). Should the connection 2108*a* and/or the R1 data storage system 2102 experience a failure or disaster whereby access to R1 2124 configured as LUN A is unavailable, processing may be performed on the host 2110*a* to modify the state of path 2404 to active and commence issuing I/Os to the R2 device configured as LUN A. In this manner, the R2 device 2126 configured as LUN A may be used as a backup accessible to the host 2110*a* for servicing I/Os upon failure of the R1 device 2124 configured as LUN A.

It should be noted although only a single RDF link 2402 is illustrated, more generally any number of RDF links may be used in connection with replicating data from systems 2102 to system 2104 in connection with techniques herein.

Figure 7C:
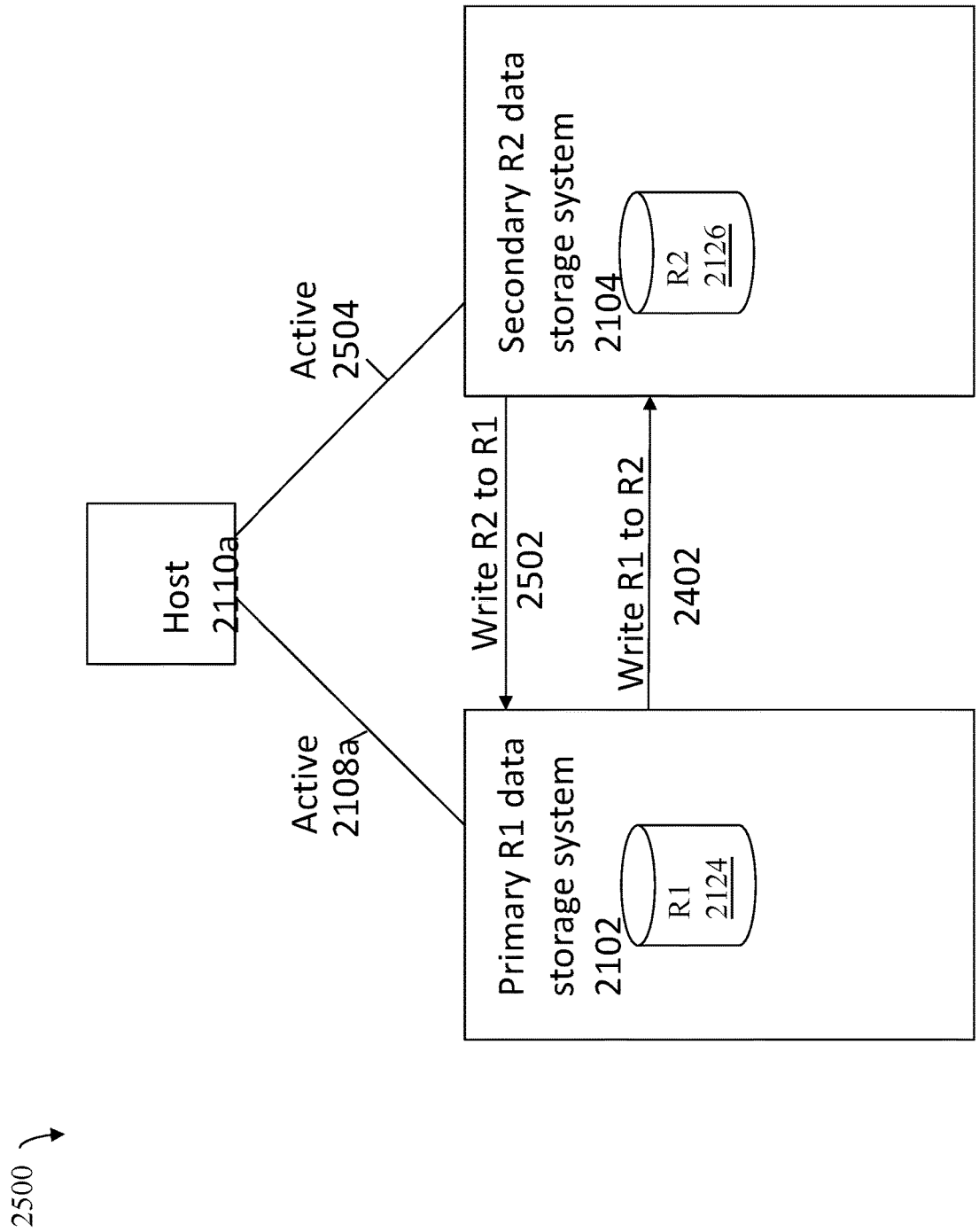

Referring to FIG. 7C, shown is another example configuration of components that may be used in an embodiment in accordance with techniques herein. The example 2500 illustrates an active-active configuration as may be used in connection with synchronous replication in at least one embodiment in accordance with techniques herein. In an active-active configuration with synchronous replication, the host 2110*a* may have a first active path 2108*a* to the R1 data storage system and R1 device 2124 configured as LUN A. Additionally, the host 2110*a* may have a second active path 2504 to the R2 data storage system and R2 device 2126 configured as LUN A. From the view of the host 2110*a*, paths 2108*a* and 2504 appear as 2 paths to the same LUN A as described in connection with FIG. 7B with the difference that the host in the example 2500 configuration may issue I/Os, both reads and/or writes, over both of paths 2108*a* and 2504. The host 2110*a* may send a first write over path 2108*a* which is received by the R1 system 2102 and written to cache of the R1 system 2102 where, at a later point in time, the first write is de-staged from the cache of the R1 system 2102 to physical storage provisioned for the R1 device 2124 configured as LUN A. The R1 system 2102 also sends the first write to the R2 system 2104 over link 2402 where the first write is written to cache of the R2 system 2104, where, at a later point in time, the first write is de-staged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110*a* over path 2108*a* that the first write has completed.

The host 2110*a* may also send a second write over path 2504 which is received by the R2 system 2104 and written to cache of the R2 system 2104 where, at a later point in time, the second write is de-staged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is de-staged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110*a* over path 2504 that the second write has completed.

Thus, in the example 2500, the illustrated active-active configuration includes a first RDF R1-R2 device pairing configured for synchronous replication (from 2102 to 2104) where the R1 device is 2124 and the R2 device is 2126 whereby writes to LUN A sent over 2108a to system 2102 are stored on the R1 device 2124 and also transmitted to system 2104 over 2402. The write sent over 2402 to system 2104 is stored on the R2 device 2126. Such replication is performed synchronously in that the acknowledgement to the host write sent over 2108a is not acknowledged as successfully completed unless and until the write data has been stored in caches of systems 2102 and 2104.

In a similar manner, the illustrated active-active configuration of the example 2500 includes a second RDF R1-R2 device pairing configured for synchronous replication (from 2104 to 2102) where the R1 device is 2126 and the R2 device is 2124 whereby writes to LUN A sent over 2504 to system 2104 are stored on the device 2126 (now acting as the R1 device of the second RDF device pairing) and also transmitted to system 2102 over connection 2502. The write sent over 2502 is stored on the R2 device 2124. Such replication is performed synchronously in that the acknowledgement to the host write sent over 2504 is not acknowledged as successfully completed unless and until the write data has been stored in caches of systems 2102 and 2104.

Effectively, using the second RDF device pairing in the active-active configuration with synchronous replication as in FIG. 7C has the R2 system 2104 act as another primary data storage system which facilitates propagation of writes received at the data storage system 2104 to the data storage system 2102. It should be noted that although FIG. 7C illustrates for simplicity a single host accessing both the R1 device 2124 and R2 device 2126, any number of hosts may access one or both of the R1 device 2124 and the R2 device 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with techniques herein, the Fibre Channel (FC) protocol may be used in connection with communications (e.g., over the SAN including the RDF links) between the data storage system 2102 and 2104.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate I/O over the FEP identified in column 806. Other information, for example, the host and/or the HBA associated with the host port and/or the FA associated with the FEP may be specified in column 808. A data structure other than a table, for example, a linked list and/or object-oriented data structure, may be used to record the same information.

To properly configure I/O connectivity between host ports, FEPs and LSUs, it may be necessary to know the permissible I/O paths between host ports and FEPs (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and FEP IDs (WWNs), each pair specifying a host port ID and an FEP ID, each identified host port corresponding to a directly connected (e.g., by an FC cable) SHP of the switch and each identified FEP corresponding to a directly connected SSP of the switch. Thus, the zoning table of a switch defines permissible I/O paths between a host system and a storage system over the switch, each I/O path defined by (and including) a host port and an FEP. Such I/O paths may be referred to herein as "zoned I/O paths" or "enabled I/O paths," and the process of defining (including initially defining and later modifying) enabled I/O paths in a zoning table, or the resulting enabled I/O paths collectively, may be referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port is permitted to communicate over a fabric. Other information, for example, host, HBA, HA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments of the invention, a CWO queue and/or a DWO queue are employed. FIG. 10A is a block diagram illustrating an example of a CWO queue 1000, according to embodiments of the invention. Other embodiments of a CWO queue, for example, variations of the CWO queue 1000, are possible and are intended to fall within the scope of the invention. The CWO queue 1000 may be used only during the creation of a snapshot or continuously.

The CWO queue 1000 may include a plurality of entries 1003, each entry representing a current CWO on the storage system. Each entry may include: an LSU ID in an LSU column 1002; an I/O operation ID in an I/O operation column 1004; a status of the I/O operation in the status column 1006; an FA port ID and a host port ID of the I/O path of the write operation in FA port column 1108 and host port column 1110, respectively; and perhaps other information in column 1012. It should be appreciated that some of the information in each entry may be determined from other data structures described herein such that the information does not need to be included in the entry but can be determined by accessing the other data structure (e.g., using the LSU ID and/or I/O operation ID as an index key).

In some embodiments, the CWO queue 1000 may be populated in response to receiving a request to create a snapshot, and only updated and accessed during the snapshot process; whereas in other embodiments the CWO queue 1000 is continuously populated, accessed and updated. The CWO queue 1000 may be used to determine the CWOs at the time an instruction to create a snapshot is received (or in some embodiments populated for such CWOs at the time such instruction is received), so that the processing of the CWOs may be held during the creation of a snapshot (e.g., while a consistency window is open) and released after the snapshot has been created. The CWO queue 1000 may be used during the performance of the method 1100.

FIG. 10B is a block diagram illustrating an example of a DWO queue 1050, according to embodiments of the invention. Other embodiments of a DWO queue, for example, variations of the DWO queue 1050, are possible and are intended to fall within the scope of the invention.

The DWO queue 1050 may include a plurality of entries 1053, each entry representing a current DWO on the storage system. Each entry may include: an LSU ID in an LSU column 1052; an I/O operation ID in an I/O operation column 1054; a status of the I/O operation in the status column 1056; an FA port ID and a host port ID of the I/O path of the write operation in FA port column 1058 and host port column 1060, respectively; and perhaps other information in column 1062. It should be appreciated that some of the information in each entry may be determined from other data structures described herein such that the information does not need to be included in the entry but can be determined by accessing the other data structure (e.g., using the LSU ID and/or I/O operation ID as an index key).

In some embodiments, the DWO queue 1050 may be populated in response to receiving a request to create a snapshot, and only updated and accessed during the snapshot process; whereas in other embodiments the DWO queue 1050 is continuously populated, accessed and updated. The DWO queue 1050 may be used to determine the DWOs at the time an instruction to create a snapshot is received (or in some embodiments populated for such DWOs at the time such instruction is received). The status of an entry in the DWO queue 1050 for a DWO may be updated (or the entry removed) when the DWO is completed. The DWO queue 1050 may be used during the snapshot process to determine when the processing of all of the DWOs at the time the snapshot creation instruction was received have been completed. The DWO queue 1050 may be used during the performance of the method 1100.

Figure 11:
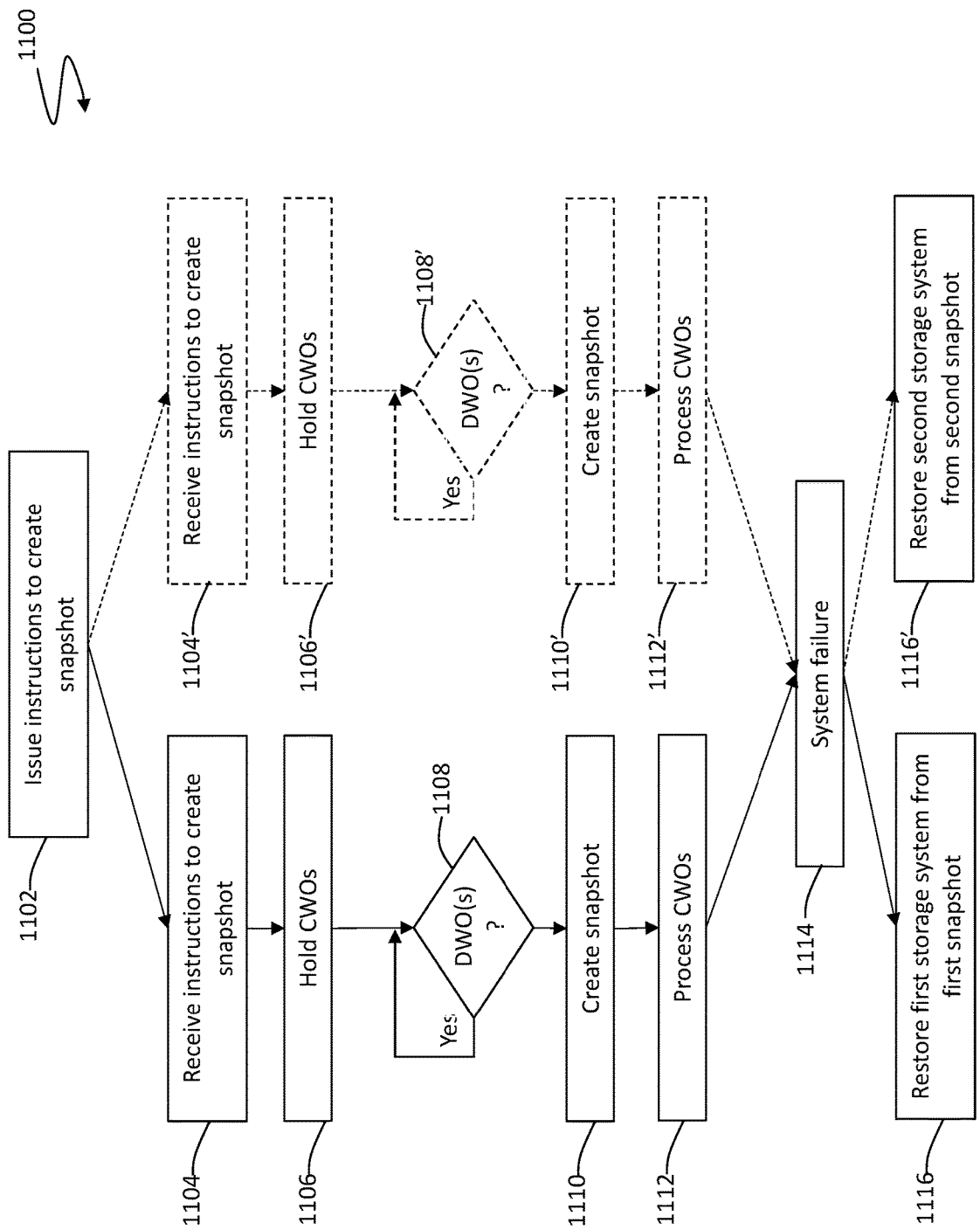
FIG. 11 is a flowchart illustrating an example of a method of creating a snapshot and recovering from a failure on a storage system, according to embodiments of the invention.

FIG. 11 is a flowchart illustrating an example of a method 1100 of creating a snapshot and recovering from a failure on a storage system, according to embodiments of the invention. Other embodiments of creating a snapshot and recovering from a failure on a storage system, for example, variations of the method 1100, are possible and are intended to fall within the scope of the invention. The method 1100 may be implemented by one or more components of a storage network (e.g., 10), for example, one or more host adapters 21a and/or management module 40 of the storage system 20a, a management component located externally to the storage system 20a, e.g., on one of the host systems 14a-n or elsewhere, or any suitable combination of the foregoing.

In a step 1102, an instruction may be issued to create a snapshot for an LSU, for example, by a process running internally or externally to the storage system. The instruction may be issued at a predetermined time (e.g., according to a schedule) or in response to an event (e.g., user input). In a step 1104, the instruction may be received at the storage system, for example, at an FA of the storage system. In a step 1106, current CWOs for the LSU may be held, e.g., prevented from continuing to be processed. Each of the FAs (or like processes) on the storage system may determine its current CWOs for the LSU, for example, in response to an instruction from the FA that received the snapshot creation instruction. An FA may determine its current CWOs for the LSU, for example, by accessing its own one or more CWO queues 1000. For example, the FA may have a corresponding CWO queue for each LSU or one CWO queue for all LSUs.

For each determined CWO for the LSU, the responsible FA may hold the CWO by not responding to the write command (e.g., CDB) of the CWO as opposed to responding to the host that issued the write operation that the FA is ready to receive the write data (e.g., by responding with a "Transfer Ready" code in accordance with SCSI). The issuing host may be configured to not send the write data until it receives the indication from the FA that the FA is ready to receive the write data.

In a step 1108, it may be determined whether there are any current DWOs for the LSU. Each of the FAs (or like processes) on the storage system may determine its current DWOs for the LSU, for example, in response to an instruction from the FA that received the snapshot creation instruction ("the controlling FA"). An FA may determine its current DWOs for the LSU, for example, by accessing its own one or more DWO queues 1050. For example, the FA may have a corresponding DWO queue for each LSU or one DWO queue for all LSUs. Each FA may communicate to the controlling FA (or other controlling process) whether or not it has any DWOs. If it is determined in the step 1108 (e.g., as described) that there are current DWOs for the LSU, then the step 1108 will be repeated. For example, if it is determined that there are any FAs that have DWOs, the controlling FA may continue to poll each such FA until the FA communicates to the controlling FA that there are no more DWOs for the FA. This process may be repeated for all FAs reporting DWOs until none of such FAs report DWOs.

A DWO may be deemed complete when the storage system at which the DWO was received acknowledged completion of the write operation to the host that issued the write operation; for example, sends an "ACK" to the host system.

If it is determined in the step 1108 that there are no DWOs for the LSU, either because there were none when the snapshot instruction was received, or because any DWOs from the time the snapshot instruction was received have completed processing, the snapshot may be created in a step 1110 in accordance with any of a variety of known or later developed techniques, including any of those referenced herein.

When creation of the snapshot is complete, the hold on CWOs may be released so that the CWOs may be processed in a step 1112. For example, the FAs who were holding CWOs by not responding to write commands to indicated that they are ready to receive the write data, may now indicate to the issuing host that they are ready to receive the write data, e.g., by sending a Transfer Ready response to the write command. Releasing the hold on the CWOs may be performed as part of closing the consistency window.

At a later point in time, a system failure (encompassing the storage system) may occur in a step 1114. Alternatively, a scheduled system shutdown may be performed. In a step 1116, the storage system may be restored using the snapshot created in the step 1110.

In some embodiments of the invention, synchronous replication may be employed between two storage systems (R1 and R2), for example, in an active-active configuration. In such embodiments, the instruction to create a snapshot for a certain point in time may be sent simultaneously to both R1 and R2. In response, steps 1104-1112 may be performed as described on R1, and steps 1104'-1112' may be performed concurrently on R2, where the steps 1104'-1112' are the same as the steps 1104-1112, respectively. Further, in response to a system failure that encompasses both R1 and R2, the step 1116 of restoration (i.e., recovery) may be performed on R1, while the same step 1116' may be performed independently and concurrently on R2.

The independent and concurrent performance of the steps 1116 and 1116' on R1 and R2, respectively, should not cause any data corruption or inconsistency between R1 and R2 because the snapshots of each LRU pair mirrored (i.e., synchronized) between R1 and R2 should be identical based on the concurrent performance of the steps 1104-1112 and 1104'-1112'. By being able to restore R1 and R2 in parallel rather than serially in the case of non-identical snapshots, significant time may be saved, improving system performance and reducing the amount of time the system may be vulnerable to failure while the restoration is performed.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 1100 or parts thereof, may be implemented using one or more of the systems and/or data structures described in relation to FIGS. 1-10B or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
 receiving at a storage system an instruction to generate a first snapshot of a logical storage unit;
 determining if one or more write operations for the logical storage unit have data currently being processed on the storage system when the instruction is received;
 if the one or more write operations for the logical storage unit have data currently being processed on the storage system when the instruction is received, determining when the processing of the one or more write operations on the storage system is completed; and
 in response to determining that the processing of the data of the one or more write operations has been completed on the storage system, generating the first snapshot of the logical storage unit, wherein the storage system includes a plurality of directors that process I/O operations on the storage system, and
 wherein said determining if the one or more write operations for the logical storage unit have data currently being processed on the storage system when the instruction is received includes polling each of the plurality of directors to determine whether each of the plurality of directors is currently processing data for any write operations.

2. The method of claim 1, further comprising:
 in response to receiving the instruction, for each write operation initiated by a host system for which data has not started being processed on the storage system when the instruction is received, preventing the processing of the data of the write operation on the storage system until the generation of the first snapshot is complete.

3. The method of claim 2, further comprising:
for each of the one or more write operations for which the processing of the data on the storage system has been prevented until the generation of the first snapshot is complete, creating an entry in a queue, each entry in the queue representing a respective one of the one or more write operations for which the processing of the data on the storage system has been prevented; and
in response to completion of the generation of the first snapshot, starting the processing of the data of each write operation having any entry in the queue.

4. A method comprising:
receiving at a storage system an instruction to generate a first snapshot of a logical storage unit;
determining if one or more write operations for the logical storage unit have data currently being processed on the storage system when the instruction is received;
if the one or more write operations for the logical storage unit have data currently being processed on the storage system when the instruction is received, determining when the processing of the one or more write operations on the storage system is completed;
in response to determining that the processing of the data of the one or more write operations has been completed on the storage system, generating the first snapshot of the logical storage unit; and
for each of the one or more write operations that have data currently being processed on the storage system when the instruction is received, creating an entry in a queue, each entry in the queue representing a respective one of the one or more write operations having data currently being processed on the storage system when the instruction is received.

5. The method of claim 1, wherein the storage system is a first storage system configured to synchronously replicate data of the logical storage unit to a second storage system,
wherein it is determined that one or more write operations for the logical storage unit have data currently being processed on the first storage system, including the one or more write operations being replicated to the second storage system,
wherein the method further comprises:
receiving at the second storage system an instruction to generate a second snapshot of the logical storage unit specific to a same point in time as the first snapshot of the first storage system, and
generating the second snapshot on the second storage system, and wherein the first snapshot and the second snapshot are identical.

6. The method of claim 5, further comprising:
in response to a failure on a system including the first storage system and the second storage system, recovering data of the logical storage unit on the first storage system using the first snapshot independently of, and concurrently to, recovering data of the logical storage unit on the second storage system using the second snapshot.

7. A system including executable logic that implements a method comprising:
receiving at a storage system an instruction to generate a first snapshot of a logical storage unit;
determining if one or more write operations for the logical storage unit have data currently being processed on the storage system when the instruction is received;
if the one or more write operations for the logical storage unit have data currently being processed on the storage system when the instruction is received, determining when the processing of the one or more write operations on the storage system is completed; and
in response to determining that the processing of the data of the one or more write operations has been completed on the storage system, generating the first snapshot of the logical storage unit, wherein the storage system includes a plurality of directors that process I/O operations on the storage system, and
wherein said determining if the one or more write operations for the logical storage unit have data currently being processed on the storage system when the instruction is received includes polling each of the plurality of directors to determine whether each of the plurality of directors is currently processing data for any write operations.

8. The system of claim 7, wherein the method further comprises:
in response to receiving the instruction, for each write operation initiated by a host system for which data has not started being processed on the storage system when the instruction is received, preventing the processing of the data of the write operation on the storage system until the generation of the first snapshot is complete.

9. The system of claim 8, wherein the method further comprises:
for each of the one or more write operations for which the processing of the data on the storage system has been prevented until the generation of the first snapshot is complete, creating an entry in a queue, each entry in the queue representing a respective one of the one or more write operations for which the processing of the data on the storage system has been prevented; and
in response to completion of the generation of the first snapshot, starting the processing of the data of each write operation having any entry in the queue.

10. A system including executable logic that implements a method comprising:
receiving at a storage system an instruction to generate a first snapshot of a logical storage unit;
determining if one or more write operations for the logical storage unit have data currently being processed on the storage system when the instruction is received;
if the one or more write operations for the logical storage unit have data currently being processed on the storage system when the instruction is received, determining when the processing of the one or more write operations on the storage system is completed;
in response to determining that the processing of the data of the one or more write operations has been completed on the storage system, generating the first snapshot of the logical storage unit; and
for each of the one or more write operations that have data currently being processed on the storage system when the instruction is received, creating an entry in a queue, each entry in the queue representing a respective one of the one or more write operations having data currently being processed on the storage system when the instruction is received.

11. The system of claim 7, wherein the storage system is a first storage system configured to synchronously replicate data of the logical storage unit to a second storage system,
wherein it is determined that one or more write operations for the logical storage unit have data currently being processed on the first storage system, including the one or more write operations being replicated to the second storage system, wherein the method further comprises:
receiving at the second storage system an instruction to generate a second snapshot of the logical storage unit specific to a same point in time as the first snapshot of the first storage system, and
generating the second snapshot on the second storage system, and wherein the first snapshot and the second snapshot are identical.

12. The system of claim 11, wherein the method further comprises:
in response to a failure on a system including the first storage system and the second storage system, recovering data of the logical storage unit on the first storage system using the first snapshot independently of, and concurrently to, recovering data of the logical storage unit on the second storage system using the second snapshot.

13. One or more non-transitory computer-readable media having software stored thereon, the software comprising:
executable code that receives at a storage system an instruction to generate a first snapshot of a logical storage unit;
executable code that determines if one or more write operations for the logical storage unit have data currently being processed on the storage system when the instruction is received;
executable code that determines, if the one or more write operations for the logical storage unit have data currently being processed on the storage system when the instruction is received, when the processing of the one or more write operations on the storage system is completed; and
executable code that, in response to determining that the processing of the data of the one or more write operations has been completed on the storage system, generates the first snapshot of the logical storage unit, wherein the storage system includes a plurality of directors that process I/O operations on the storage system, and
wherein said executable code that determines if the one or more write operations for the logical storage unit have data currently being processed on the storage system when the instruction is received further includes executable code that polls each of the plurality of directors to determine whether each of the plurality of directors is currently processing data for any write operations.

14. The one or more non-transitory computer-readable media of claim 13, wherein the software further comprises:
executable code that, in response to receiving the instruction, for each write operation initiated by a host system for which data has not started being processed on the storage system when the instruction is received, prevents the processing of the data of the write operation on the storage system until the generation of the first snapshot is complete.

15. The one or more non-transitory computer-readable media of claim 14, wherein the software further comprises:
executable code that, for each of the one or more write operations for which the processing of the data on the storage system has been prevented until the generation of the first snapshot is complete, creates an entry in a queue, each entry in the queue representing a respective one of the one or more write operations for which the processing of the data on the storage system has been prevented; and
executable code that, in response to completion of the generation of the first snapshot, starts the processing of the data of each write operation having any entry in the queue.

16. One or more non-transitory computer-readable media having software stored thereon, the software comprising:
executable code that receives at a storage system an instruction to generate a first snapshot of a logical storage unit;
executable code that determines if one or more write operations for the logical storage unit have data currently being processed on the storage system when the instruction is received;
executable code that determines, if the one or more write operations for the logical storage unit have data currently being processed on the storage system when the instruction is received, when the processing of the one or more write operations on the storage system is completed; and
executable code that, in response to determining that the processing of the data of the one or more write operations has been completed on the storage system, generates the first snapshot of the logical storage unit; and
executable code that, for each of the one or more write operations that have data currently being processed on the storage system when the instruction is received, creates an entry in a queue, each entry in the queue representing a respective one of the one or more write operations having data currently being processed on the storage system when the instruction is received.

17. The one or more non-transitory computer-readable media of claim 13, wherein the storage system is a first storage system configured to synchronously replicate data of the logical storage unit to a second storage system,
wherein it is determined that one or more write operations for the logical storage unit have data currently being processed on the first storage system, including the one or more write operations being replicated to the second storage system,
wherein the software further comprises:
executable code that receives at the second storage system an instruction to generate a second snapshot of the logical storage unit specific to a same point in time as the first snapshot of the first storage system, and
executable code that generates the second snapshot on the second storage system, and wherein the first snapshot and the second snapshot are identical.

18. The one or more non-transitory computer-readable media of claim 17, wherein the software further comprises:
executable code that, in response to a failure on a system including the first storage system and the second storage system, recovers data of the logical storage unit on the first storage system using the first snapshot independently of, and concurrently to, recovering data of the logical storage unit on the second storage system using the second snapshot.

* * * * *